United States Patent Office 2,798,876
Patented July 9, 1957

2,798,876

N(α-β DIPHENYL ETHANOL) PYRROLIDINE COMPOUNDS

Richard V. Heinzelman, Kalamazoo Township, Kalamazoo County, and Brooke D. Aspergren, Kalamazoo, Mich., assignors to The Upjohn Company, Kalamazoo, Mich., a corporation of Michigan No Drawing. Application November 12, 1952, Serial No. 320,121

27 Claims. (Cl. 260—326.5)

This invention relates to new compositions of matter which possess therapeutic value. More particularly, the invention relates to phenylpyrrolidylethanols, acid addition and quaternary ammonium salts thereof, and to a method for the preparation of these compounds.

The novel phenylpyrrolidylethanols are represented by the following general formula:

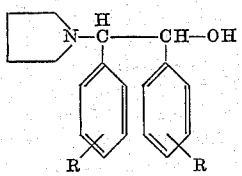

wherein R is an alkoxy radical containing from one to eight carbon atoms inclusive.

It is an object of the present invention to provide novel phenylpyrrolidylethanols possessing valuable therapeutic properties. Another object of this invention is to provide a process for the preparation of these compounds. Other objects and features of the invention will be apparent to those skilled in the art to which this invention pertains.

The foregoing and additional objects are accomplished by the provision of compounds having the formula given above.

These novel compounds are useful for therapeutic purposes, for instance, as bronchodilators. In addition, the phenylpyrrolidylethanols of the present invention and their acid addition and quaternary ammonium salts counteract histamine-induced spasm of smooth muscle tissue and are therefore useful in the treatment of various allergic manifestations such as, for example, hay fever.

The compounds of the present invention may be prepared by dissolving a phenylpyrrolidylacetophenone, otherwise referred to as a desylpyrrolidine, in a solvent such as anhydrous diethyl ether, benzene, tetrahydrofuran, or the like, and then subjecting the resulting solution to the action of a chemical reducing agent such as a metallic hydride, preferably lithium aluminum hydride, at a temperature maintained between about fifteen and 100 degrees centigrade, preferably at about 35 degrees centigrade. The hydrogenation of a phenylpyrrolidylacetophenone to the corresponding phenylpyrrolidylethanol is usually effected within a period of about one to about five hours depending upon the reactants employed. By adding water to the reaction mixture to hydrolyze the lithium aluminum complex, followed by extraction with a water-immiscible solvent such as, for example, ether, chloroform, ethyl acetate, or the like, a solution containing the desired phenylpyrrolidylethanol is obtained. After drying the extract containing the phenylpyrrolidylethanol and adding thereto an alcoholic solution of a desired acid such as hydrogen chloride, sulfuric acid, or the like, the corresponding acid addition salt of the phenylpyrrolidylethanol is obtained. The acid addition salts of the phenylpyrrolidylethanol thus-prepared can be purified by recrystallization from a suitable solvent such as anhydrous ethanol, a mixture of an alcohol and ethyl acetate, or the like.

While lithium aluminum hydride is the preferred chemical reducing agent in this process, satisfactory results are likewise obtained by using other metallic hydrides such as, for example, sodium hydride, potassium hydride, sodium borohydride, potassium borohydride, lithium hydride or the like.

The phenylpyrrolidylethanols of the present invention are generally low-melting solids or oils which are readily soluble in the common organic solvents such as ether, ethyl acetate, benzene, or the like; soluble in oils such as peanut oil, cottonseed oil, soybean oil, or the like; and insoluble in water.

Due to the presence of nitrogen in the molecule, the phenylpyrrolidylethanols react with suitable acids to form acid addition salts. Representative acids which may be used include mineral acids such as hydrogen chloride, hydrogen bromide, sulfuric acid, or the like; aliphatic carboxylic acids such as acetic acid, lactic acid, tartaric acid, succinic acid, or the like; aromatic acids such as benzoic acid, or the like; and strongly acidic phenols such as picric acid, or the like.

Various procedures can be used to prepare the acid addition salts of the phenylpyrrolidylethanols of the present invention. A convenient method involves mixing, in stoichiometric proportions, a phenylpyrrolidylethanol dissolved in an organic solvent in which the resulting acid addition salt is insoluble, and the selected acid, whereupon the resulting insoluble phenylpyrrolidylethanol acid addition salt usually precipitates from the solution. Another method for the preparation of phenylpyrrolidylethanol acid addition salts involves admixing a solution of a phenylpyrrolidylethanol, in a solvent such as ethyl acetate or the like, with an alcoholic solution of a selected acid and then evaporating the resulting solution to dryness to obtain the desired acid addition salt of the phenylpyrrolidylethanol in solid form. Other methods for preparing acid addition salts of amines may also be used and are known in the art.

Quaternary ammonium salts of the phenylpyrrolidylethanols of the present invention may be prepared in any convenient manner known in the art, as by mixing a phenylpyrrolidylethanol with a selected ester in stoichiometric proportions, either in the presence of an organic solvent in which the resulting quaternary ammonium salt is insoluble so that precipitation occurs upon formation thereof, or by mixing solutions of a selected ester and a phenylpyrrolidylethanol and evaporating to dryness to yield the solid quaternary ammonium salt. Representative esters which may be used to form quaternary ammonium salts are alkyl halides, aralkyl halides, and alkyl esters of arylsulfonic acids, such as, for example, methyl bromide, methyl iodide, cetyl bromide, myristyl iodide, lauryl bromide, benzyl chloride, allyl bromide, ethyl-(para-toluene)-sulfonate, or the like, in which cases the phenylpyrrolidylethanol and selected salt forming agent are merely mixed together, heated to complete the reaction, and the desired quaternary ammonium salt of phenylpyrrolidylethanol thereafter isolated.

The acid addition and quaternary ammonium salts of the phenylpyrrolidylethanols are generally water-soluble crystalline compounds possessing well-defined melting points and are usually soluble in lower-aliphatic alcohols and substantially insoluble in solvents such as diethyl ether, benzene, carbon tetrachloride, and the like.

The phenylpyrrolidylacetophenones used as starting material in the preparation of the phenylpyrrolidylethanols of the present invention are obtained by reacting an alpha-hydroxy ketone such as anisoin, ortho-anisoin, or the like, with pyrrolidine in the presence of an acid-type catalyst such as concentrated hydrochloric acid, zinc chloride, phosphorus trichloride or phosphorus pentoxide, the latter being especially preferred, preferably at an elevated temperature for several hours. The phenylpyrrolidylacetophenone thus-formed may be isolated from the reaction mixture by the addition of a water-immiscible organic solvent such as diethyl ether, benzene, ethyl acetate, or the like, extracting the resulting solution with a dilute aqueous-acid solution, treating the aqueous-acid extract thus-obtained with an alkali, and extracting the phenylpyrrolidylacetophenone with ether. The ether extract is then dried and the solvent removed therefrom by distillation to obtain the desired phenylpyrrolidylacetophenone in solid form.

The following preparations and examples are illustrative of the processes and products of this invention and are not to be construed as limiting.

PREPARATION 1.—N-(PARA,PARA'-DI-METHOXYDESYL)-PYRROLIDINE

A mixture of 27.2 grams of para-anisoin, 7.1 grams of pyrrolidine, and two grams of phosphorus pentoxide was heated at about 100 degrees centigrade for four hours. After cooling the reaction mixture, 250 milliliters of a one-normal hydrochloric acid solution was added thereto. The acid-extract containing the thus-formed N - (para,para'-di-methoxydesyl)-pyrrolidine was decolorized with activated carbon, made alkaline with a dilute aqueous sodium hydroxide solution, and extracted twice with 200-milliliter portions of diethyl ether. The ether extracts were combined, dried over anhydrous sodium sulfate and the solvent removed therefrom by distillation to obtain N - (para,para' - di - methoxydesyl) - pyrrolidine in solid form. To convert the free base to its hydrochloride salt, ten grams of the thus-produced N - (para,para' - di - methoxydesyl) - pyrrolidine was dissolved in about 200 milliliters of ether and mixed with fifty milliliters of an ethanolic solution of hydrogen chloride. The semi-solid which formed was separated by decantation and recrystallized from a mixture of ethanol and ether. The substantially pure N - (para,para' - di - methoxydesyl) - pyrrolidine hydrochloride melted at 225 to 227 degrees centigrade, with decomposition.

PREPARATION 2.—N-(ORTHO,ORTHO'-DI-METHOXY-DESYL)-PYRROLIDINE

A mixture of 27.2 grams of ortho-anisoin, 7.1 grams of pyrrolidine, and two grams of phosphorus pentoxide was heated at about 100 degrees centrigrade for three hours, cooled, and then extracted with about 200 milliliters of ether. The ether extract was washed twice with 200-milliliter portions of water, whereafter 200 milliliters of a one-normal aqueous hydrochloric acid solution was added thereto. The resulting aqueous-acid extract was made alkaline with a dilute aqueous sodium hydroxide solution and extracted with 200 milliliters of ether. The ether extract was dried over anhydrous sodium sulfate and the solvent removed therefrom by distillation to obtain N - (ortho,ortho' - di - methoxydesyl) - pyrrolidine in solid form. To convert the free base to its hydrochloride salt, ten grams of the thus-produced N - (ortho,ortho' - di - methoxydesyl) - pyrrolidine was dissolved in about 200 milliliters of ethyl acetate and mixed with fifty milliliters of an ethanolic solution of hydrogen chloride. The N - (ortho,ortho' - di - methoxy - desyl)-pyrrolidine hydrochloride thus-formed was recovered from the alcoholic solution in the form of a gummy solid.

PREPARATION 3.—N-(META,META'-DI-METHOXYDESYL)-PYRROLIDINE

Following the procedure set forth supra in Preparation 1 except for the substitution of para-anisoin by meta-anisoin, N - (meta,meta' - di - methoxydesyl) - pyrrolidine is obtained in solid form.

Following the procedure set forth above, other phenyl-pyrrolidylacetophenones may be prepared, such as, for example, N - (para,para' - di - ethoxydesyl) - pyrrolidine, N - (ortho,ortho' - di - ethoxydesyl) - pyrrolidine, N - (meta,meta' - di - ethoxydesyl) - pyrrolidine, N - (para, - para' - di - propoxydesyl) - pyrrolidine, N - (ortho,para' - di - propoxydesyl) - pyrrolidine, N - (meta,para' - di - propoxydesyl) - pyrrolidine, N - (para,para' - di - butoxydesyl) - pyrrolidine, N - (ortho,para' - di - butoxydesyl) - pyrrolidine, N - (meta,para' - di - butoxydesyl) - pyrrolidine, N - (para,para' - di - amyloxydesyl) - pyrrolidine, N - (ortho,para' - di - amyloxydesyl) - pyrrolidine, N - (meta,para' - di - amyloxydesyl) - pyrrolidine, N - (para,para' - di - hexyloxydesyl) - pyrrolidine, N - (ortho,para' - di - hexyloxydesyl) - pyrrolidine, N - (meta,para' - di - hexyloxydesyl) - pyrrolidine, N - (para,para' - di - heptyl - oxydesyl) - pyrrolidine, N - (ortho,para' - di - heptyloxy - desyl) - pyrrolidine, N - (meta, para' - di - heptyloxy - desyl) - pyrrolidine, N - (para,para' - di - octyloxydesyl) - pyrrolidine, N - (ortho,para' - di - octyloxydesyl) - pyrrolidine, N - (meta,para' - di - octyloxydesyl) - pyrrolidine, N - (para - methoxy - para' - ethoxydesyl) - pyrrolidine, N - (ortho - methoxy - para' - ethoxydesyl) - pyrrolidine, N - (meta - methoxy - para' - ethoxydesyl) - pyrrolidine, N - (para - methoxy - para' - propoxydesyl) - pyrrolidine, N - (ortho - methoxy - para' - propoxydesyl) - pyrrolidine, N - (meta - methoxy - para' - propoxydesyl) - pyrrolidine, N - (para - methoxy - para' - butoxydesyl) - pyrrolidine, N - (ortho - methoxy - para' - butoxydesyl) - pyrrolidine, N - (meta - methoxy - para' - butoxydesyl) - pyrrolidine, N - (para - methoxy - para' - amyloxydesyl) - pyrrolidine, N - (ortho - methoxy - para' - amyloxydesyl) - pyrrolidine, N - (meta - methoxy - para' - amyloxydesyl) - pyrrolidine, N - (para - methoxy - para' - hexyloxydesyl) - pyrrolidine, N - (ortho - methoxy - para' - hexyloxy - desyl) - pyrrolidine, N - (meta - methoxy - para' - hexyl - oxydesyl) - pyrrolidine, N - (para - methoxy - para' - heptyloxydesyl) - pyrrolidine, N - (ortho - methoxy - para' - heptyloxydesyl) - pyrrolidine, N - (meta - methoxy - para' - heptyloxydesyl) - pyrrolidine, N - (para - methoxy - para' - octyloxydesyl) - pyrrolidine, N - (ortho - methoxy - para' - octyloxydesyl) - pyrrolidine, N - (meta - methoxy - para' - octyloxydesyl) - pyrrolidine, N - (para - ethoxy - para' - propoxydesyl) - pyrrolidine, N - (para - ethoxy - para' - methoxydesyl) - pyrrolidine, N - (para - ethoxy - para' - butoxydesyl) - pyrrolidine, N - (para - ethoxy -para' - amyloxydesyl) - pyrrolidine, N - (para - ethoxy - para' - hexyloxydesyl) - pyrrolidine, N - (para - ethoxy - para' - heptyloxydesyl) - pyrrolidine, N - (para - ethoxy - para' - octyloxydesyl) - pyrrolidine, N - (para - propoxy - para' - butoxydesyl) - pyrrolidine, N - (para - propoxy - para' - methoxydesyl) - pyrrolidine, N - (para - propoxy - para' - ethoxydesyl) - pyrrolidine, N - (para - propoxy - para' - amyloxydesyl) - pyrrolidine, N - (para - propoxy - para' - hexyloxydesyl) - pyrrolidine, N - (para - propoxy - para' - heptyloxydesyl) - pyrrolidine, N - (para - propoxy - para' - octyloxydesyl) - pyrrolidine, N - (para - butoxy - para' - ethoxydesyl) - pyrrolidine, N - (para - butoxy - para' - methoxydesyl) - pyrrolidine, N - (para - butoxy - para' - propoxydesyl) - pyrrolidine, N - (para - butoxy -para' - amyloxydesyl) - pyrrolidine, N - (para - butoxy - para' - hexyloxydesyl) - pyrrolidine, N - (para - butoxy - para' - heptyl - oxydesyl) - pyrrolidine, N - (para - butoxy - para' - octyloxydesyl) - pyrrolidine, acid addition salts of the foregoing free amine bases, and the like.

*Example 1.—α,β-Di-(ortho-methoxyphenyl)-β-(pyrrolidyl-1)-ethanol*

Two grams of lithium aluminum hydride was dissolved in 150 milliliters of dry ether and to this solution was slowly added, with stirring, a solution of 250 milliliters of ether containing 3.9 grams of N-(ortho,ortho'-di-methoxydesyl)-pyrrolidine, obtained as in Preparation 2 supra. The mixture was cooled to about 35 degrees centigrade in an ice-bath and 25 milliliters of water was slowly added thereto. The resulting mixture was poured into 500 milliliters of a ten percent aqueous sodium hydroxide solution. The ether layer was separated and dried over anhydrous sodium sulfate. The sodium sulfate was removed by filtration and the ether extract evaporated to dryness to obtain α,β-di-(ortho-methoxyphenyl)-β-(pyrolidyl-1)-ethanol in solid form.

By heating a solution of α,β-di-(ortho-methoxyphenyl)-β-(pyrrolidyl-1)-ethanol with methyl bromide in benzene and cooling and concentrating the solution, the corresponding α,β-di-(ortho-methoxyphenyl)-β-(pyrrolidyl-1)-ethanol methobromide is obtained.

Similarly, other quaternary ammonium salts of α,β-di-(ortho-methoxyphenyl)-β-(pyrrolidyl-1)-ethanol can be prepared such as, for example, α,β-di-(ortho-methoxyphenyl - β - (pyrrolidyl-1)-ethanol ethochloride, α,β-di-(ortho - methoxyphenyl)-β-(pyrrolidyl-1)-ethanol benzyl chloride and the like.

Example 2.—α,β-Di-(ortho-methoxyphenyl)-β-(pyrrolidyl-1)-ethanol hydrochloride Five grams of α,β-di-(ortho-methoxyphenyl)-β-(pyrrolidyl-1)-ethanol, obtained as in Example 1 supra, was dissolved in about 150 milliliters of ethyl acetate and the solution mixed with ten milliliters of an ethanolic solution of hydrogen chloride at a temperature of about fifteen degrees centigrade. α,β - Di-(ortho-methoxyphenyl) - β - (pyrrolidyl-1)-ethanol hydrochloride separated out of the solution in crystalline form and was further purified by recrystallization from a mixture of ethyl acetate and ethyl alcohol. The substantially pure α,β - di - (ortho-methoxyphenyl)-β-(pyrrolidyl-1)-ethanol hydrochloride melted at 227 to 228 degrees centigrade.

Analysis.—Calc. for $C_{20}H_{26}ClNO_3$: C, 66.01; H, 7.20; Cl, 9.74; N, 3.85. Found: C, 66.15; H, 6.96; Cl, 9.68; N, 4.10.

Example 3.—α,β-Di-(para-methoxyphenyl)-β-(pyrrolidyl-1)-ethanol

Using the procedure set forth in Example 1 supra except for the substitution of N-(ortho,ortho'-di-methoxydesyl)-pyrrolidine by N-(para,para'-di-methoxydesyl)-pyrrolidine, obtained as in Preparation 1 supra, and replacing the lithium aluminum hydride by three grams of sodium borohydride, α,β - di-(para-methoxyphenyl)-β-(pyrrolidyl-1)-ethanol is obtained in solid form.

By heating a solution of α,β-di-(para-methoxyphenyl)-β-(pyrrolidyl-1)-ethanol with methyl bromide in benzene and cooling and concentrating the solution, the corresponding α,β-di-(para-methoxyphenyl)-β-(pyrrolidyl-1)-ethanol methobromide is obtained.

Similarly, other quaternary ammonium salts of α,β-di-(para-methoxyphenyl)-β-(pyrrolidyl-1)-ethanol can be prepared such as, for example, α,β-di-(para-methoxyphenyl)-β-(pyrrolidyl-1)-ethanol benzyl chloride and the like.

Example 4.—α,β-Di-(para-methoxyphenyl)-β-(pyrrolidyl-1)-ethanol hydrochloride Five grams of α,β-di-(para-methoxyphenyl)-β-(pyrrolidyl-1)-ethanol, obtained as in Example 3 supra, was dissolved in about 150 milliliters of ethyl acetate and the solution mixed with ten milliliters of an ethanolic solution of hydrogen chloride at a temperature of about fifteen degrees centrigrade. α,β - Di - (para-methoxyphenyl)-β-(pyrrolidyl-1)-ethanol hydrochloride separted out of the solution in crystalline form and was further purified by recrystallization from a mixture of ethyl acetate and ethyl alcohol. The substantially pure α,β-di-(para - methoxyphenyl)-β-(pyrrolidyl-1)-ethanol hydrochloride melted at 215 to 216 degrees centigrade.

Analysis.—Calc. for $C_{20}H_{26}ClNO_3$: C, 66.01; H, 7.20; Cl, 9.74; N, 3.85. Found: C, 66.20; H, 6.88; Cl, 9.63; N, 3.93.

Example 5.—α,β-Di-(para-methoxyphenyl)-β-(pyrrolidyl-1)-ethanol sulfate

Following the procedure set forth in Example 4 supra except for the substitution of the ethanolic solution of hydrogen chloride by ten milliliters of an ethanolic solution of sulfuric acid, α,β-di-(para-methoxyphenyl)-β-(pyrrolidyl-1)-ethanol sulfate is obtained in the form of colorless crystals.

Example 6.—α,β-Di-(meta-methoxyphenyl)-β-(pyrrolidyl-1)-ethanol

Following the procedure set forth in Example 1 supra except for the substitution of N-(ortho,ortho'-di-methoxydesyl) - pyrrolidine, by N-(meta,meta'-di-methoxydesyl)-pyrrolidine, obtained as in Preparation 3 supra, α,β-di-(meta-methoxyphenyl)-β-(pyrrolidyl-1)-ethanol is obtained in solid form.

Example 7.—α,β-Di-(meta-methoxyphenyl)-β-(pyrrolidyl-1)-ethanol hydrochloride Following the procedure set forth in Example 2 except for the substitution of α,β-di-(ortho-methoxyphenyl)-β-(pyrrolidyl-1)-ethanol by five grams of α,β-di-(meta-methoxyphenyl)-β-(pyrrolidyl-1)-ethanol, obtained as in Example 6 supra, α,β-di-(meta-methoxyphenyl)-β-(pyrrolidyl-1)-ethanol hydrochloride is obtained in crystalline form.

Similarly other phenylpyrrolidylethanols are prepared such as, for example, α,β-di-(para-methoxyphenyl)-β-(pyrrolidyl-1)-ethanol benzoate, α,β-di-(para-ethoxphenyl)-β-(pyrrolidyl-1)-ethanol, α,β-di-(para-ethoxyphenyl)-β - (pyrrolidyl-1)-ethanol hydrochloride, α,β-di-(ortho-ethoxyphenyl) - β - (pyrrolidyl-1)-ethanol, α,β-di-(meta-ethoxyphenyl - β - (pyrrolidyl-1)-ethanol, α,β-di-(meta-ethoxyphenyl) - β - (pyrrolid*y*l-1)-ethanol hydrochloride, α,β-di-(ortho-ethoxyphenyl)-β-(pyrrolidyl-1)-ethanol hydrochloride, α,β-di-(para-propoxyphenyl)-β-(pyrrolidyl-1)-ethanol, α,β-di-(para-butoxyphenyl)-β-(pyrrolidyl-1)-ethanol, α,β-di-(para-amyloxyphenyl)-β-(pyrrolidyl-1)-ethanol, α,β-di-(para-hexyloxyphenyl)-β-(pyrrolidyl-1)-ethanol, α,β-di-(para-heptyloxyphenyl)-β-(pyrrolidyl-1)-ethanol, α,β - di-(para-octyloxyphenyl)-β-(pyrrolidyl-1)-ethanol, α - (ortho - methoxyphenyl)-β-(para'-methoxyphenyl) - β - (pyrrolidyl - 1) - ethanol, α-(para-methoxyphenyl) - β-(para'-ethoxyphenyl-β-(pyrrolidyl-1)-ethanol, α - (para-methoxyphenyl) - β - (para'-propoxyphenyl)-β-(pyrrolidyl - 1) - ethanol, α - (para-methoxyphenyl)-β-(para' - butoxyphenyl) - β - (pyrrolidyl - 1)-ethanol, α-(para - methoxyphenyl) - β - (para' - amyloxyphenyl)-β-(pyrrolidyl - 1) - ethanol, α -(para - methoxyphenyl)-β-(para' - hexyloxyphenyl) - β - (pyrrolidyl - 1) - ethanol, α - (para - ethoxyphenyl) - β - (para' - methoxyphenyl)-β - (pyrrolidyl - 1)-ethanol, α - (para - ethoxyphenyl)-β-(para' - propoxyphenyl) - β - (pyrrolidyl - 1) - ethanol, α - (para - ethoxyphenyl) - β - (para' - butoxyphenyl-β-(pyrrolidyl - 1) - ethanol, α - (para-ethoxyphenyl) - β-(para' - amyloxyphenyl) - β - (pyrrolidyl - 1) - ethanol, α - (para - propoxyphenyl) - β - (para'-methoxyphenyl)-β - (pyrrolidyl - 1) - ethanol, α - (para-propoxyphenyl)-β - (para'-ethoxyphenyl) - β - (pyrrolidyl - 1) - ethanol, α - (para-propoxyphenyl) - β - (para'-butoxyphenyl)-β-(pyrrolidyl - 1) - ethanol, α - (para-proproxyphenyl)-β-(para' - amyloxyphenyl) - β - (pyrrolidyl - 1) - ethanol, α - (para - butoxyphenyl) - β - (para' - methoxyphenyl)-β - (pyrrolidyl - 1) - ethanol, α - (para - butoxphenyl)-β-(para' - ethoxyphenyl) - β - (pyrrolidyl - 1) - ethanol, α-(para - butoxyphenyl) - β - (para'-propoxyphenyl) - β-(pyrrolidyl - 1) - ethanol, α - (para - butoxyphenyl) - β-(para' - amyloxyphenyl)-β-(pyrrolidyl-1)-ethanol, other acid addition and quaternary ammonium salts of the foregoing free amine bases, and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the group consisting of (a) pyrrolidines of the formula:

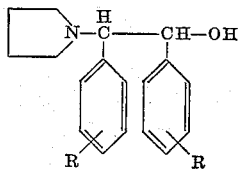

wherein R is a lower-alkoxy radical containing from one to eight carbon atoms inclusive, and (b) acid addition and quaternary ammonium salts thereof.

2. A pyrrolidine of the formula:

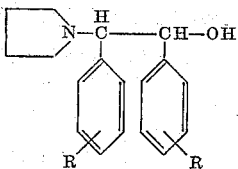

wherein R is a lower-alkoxy radical containing from one to eight carbon atoms inclusive.

3. Acid addition salts of a pyrrolidine of the formula:

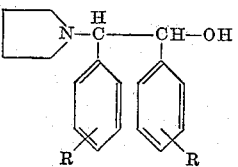

wherein R is a lower-alkoxy radical containing from one to eight carbon atoms inclusive.

4. α,β-Di-(methoxyphenyl)-β-(pyrrolidyl-1)-ethanol.

5. Acid addition salts of α,β-di-(methoxyphenyl)-β-(pyrrolidyl-1)-ethanol.

6. The hydrochloride of α,β-di-(methoxyphenyl)-β-(pyrrolidyl-1)-ethanol.

7. α,β-Di-(para-methoxyphenyl) - β - (pyrrolidyl - 1)-ethanol.

8. Acid addition salts of α,β-di-(para-methoxyphenyl)-β-(pyrrolidyl-1)-ethanol.

9. α,β-Di-(para-methoxyphenyl) - β - (pyrrolidyl - 1)-ethanol hydrochloride.

10. α,β-Di-(para-methoxyphenyl) - β - (pyrrolidyl - 1)-ethanol sulfate.

11. α,β - Di - (ortho-methoxyphenyl)-β-(pyrrolidyl-1)-ethanol.

12. Acid addition salts of α,β-di-(ortho-methoxyphenyl)-β-(pyrrolidyl-1)-ethanol.

13. α,β-Di-(ortho-methoxyphenyl) - β - (pyrrolidyl-1)-ethanol hydrochloride.

14. A process for the preparation of an α,β-di-(lower-alkoxyphenyl)-β-(pyrrolidyl-1)-ethanol which comprises mixing an N-di-lower-alkoxydesyl-pyrrolidine with a metallic hydride selected from the group consisting of lithium aluminum hydride, sodium borohydride and potassium borohydride and maintaining the resulting mixture at a temperature of between about 35 and 100 degrees centigrade to produce an α,β-di-(lower-alkoxyphenyl)-β-(pyrrolidyl-1)-ethanol.

15. A process for the preparation of an α,β-di-(methoxyphenyl)-β-(pyrrolidyl - 1)-ethanol which comprises mixing an N-di-lower-methoxydesyl-pyrrolidine with a metallic hydride selected from the group consisting of lithium aluminum hydride, sodium borohydride and potassium borohydride and maintaining the resulting mixture at a temperature of between about 35 and 100 degrees centigrade to form an α,β-di-(methoxyphenyl)-β-(pyrrolidyl-1)-ethanol.

16. A process for the preparation of α,β-di-(para-methoxyphenyl)-β-(pyrrolidyl - 1)-ethanol which comprises mixing N-(para,para'-di-methoxydesyl)-pyrrolidine with lithium aluminum hydride and maintaining the resulting mixture at a temperature between about 35 degrees and 100 degrees centigrade, to form α,β-di-(para-methoxyphenyl)-β-(pyrrolidyl-1)-ethanol.

17. A process for the preparation of α,β-di-(ortho-methoxyphenyl)-β-(pyrrolidyl - 1)-ethanol which comprises mixing N-(ortho,ortho'-di-methoxydesyl)-pyrrolidine with lithium aluminum hydride and maintaining the resulting mixture at a temperature between about 35 degrees and 100 degrees centigrade, to form α,β-di-(ortho-methoxyphenyl)-β-(pyrrolidyl-1)-ethanol.

18. A process for the preparation of an acid addition salt of an α,β-di-(lower-alkoxyphenyl)-β-(pyrrolidyl-1)-ethanol which comprises mixing an N-di-lower-alkoxy-desyl-pyrrolidine with a metallic hydride selected from the group consisting of lithium aluminum hydride, sodium borohydride and potassium borohydride, and maintaining the resulting mixture at a temperature between about 35 and 100 degrees centigrade, to form an α,β-di-(lower-alkoxyphenyl)-β-(pyrrolidyl-1)-ethanol and then treating said α,β-di-(lower-alkoxyphenyl)-β-(pyrrolidyl-1)-ethanol with an alcoholic solution of an acid to form the corresponding acid addition salt of an α,β-di-(lower-alkoxyphenyl)-β-(pyrrolidyl-1)-ethanol.

19. A process for the preparation of an acid addition salt of an α,β - di-(methoxyphenyl)-β-(pyrrolidyl-1)-ethanol which comprises mixing an N-di-methoxydesyl-pyrrolidine with a metallic hydride selected from the group consisting of lithium aluminum hydride, sodium borohydride and potassium borohydride, and maintaining the resulting mixture at a temperature between about 35 and 100 degrees centigrade, to produce an α,β-di-(methoxyphenyl)-β-(pyrrolidyl-1)-ethanol and treating said α,β-di-(methoxyphenyl) - β - (pyrrolidyl-1)-ethanol with an alcoholic solution of an acid to obtain the corresponding acid addition salt of an α,β-di-(methoxyphenyl)-β-(pyrrolidyl-1)-ethanol.

20. A process for the preparation of α,β-di-(para-methoxyphenyl)-β-(pyrrolidyl-1) - ethanol hydrochloride which comprises mixing N-(para,para'-di-methoxydesyl)-pyrrolidine with lithium aluminum hydride, maintaining the resulting mixture at a temperature between about 35 and 100 degrees centigrade to produce α,β-di-(para-methoxyphenyl)-β-(pyrrolidyl-1)-ethanol and then treating said α,β-di-(para-methoxyphenyl)-β-(pyrrolidyl-1)-ethanol with an alcoholic solution of hydrochloric acid to obtain α,β-di-(para-methoxyphenyl)-β-(pyrrolidyl-1)-ethanol hydrochloride.

21. α,β-Di-(meta-methoxyphenyl) - β - (pyrrolidyl-1)-ethanol.

22. Acid addition salts of α,β-di-(meta-methoxyphenyl)-β-(pyrrolidyl-1)-ethanol.

23. α,β-Di-(meta-methoxyphenyl) - β - (pyrrolidyl-1)-ethanol hydrochloride.

24. A process for the preparation of α,β-di-(ortho-methoxyphenyl)-β-(pyrrolidyl - 1)-ethanol hydrochloride which comprises mixing N-(ortho,ortho'-di-methoxydesyl)-pyrrolidine with lithium aluminum hydride, maintaining the resulting mixture at a temperature between about 35 and 100 degrees centigrade to produce α,β-di-(ortho - methoxyphenyl) - β - (pyrrolidyl-1)-ethanol and then treating said α,β-di-(ortho-methoxyphenyl)-β-(pyrrolidyl-1)-ethanol with an alcoholic solution of hydrochloric acid to obtain α,β-di-(ortho-methoxyphenyl)-β-(pyrrolidyl-1)-ethanol hydrochloride.

25. N-(para,para'-di-methoxydesyl)-pyrrolidine.

26. N-(ortho,ortho'-di-methoxydesyl)-pyrrolidine.

27. N-(meta,meta'-di-methoxydesyl)-pyrrolidine.

(References on following page)

References Cited in the file of this patent

UNITED STATES PATENTS

| | | |
|---|---|---|
| 2,515,700 | Denton et al. | July 18, 1950 |
| 2,552,502 | Woodruff | May 8, 1951 |
| 2,599,497 | Stoll et al. | June 3, 1952 |
| 2,600,217 | Denton et al. | June 10, 1952 |
| 2,654,745 | Rhodehamel | Oct. 6, 1953 |
| 2,680,115 | Ruddy et al. | June 1, 1954 |
| 2,682,543 | Adamson et al. | June 29, 1954 |
| 2,683,742 | Cusic | July 13, 1954 |

FOREIGN PATENTS

| | | |
|---|---|---|
| 624,118 | Great Britain | May 27, 1949 |
| 627,139 | Great Britain | July 29, 1949 |
| 805,521 | Germany | Mar. 15, 1951 |
| 884,569 | France | Aug. 20, 1949 |

OTHER REFERENCES

Jour. Am. Chem. Soc., vol. 71, pp. 122–125 (1949).